United States Patent
Ferenczi (10) Patent No.: US 12,470,384 B2
(45) Date of Patent: Nov. 11, 2025

(54) CROSS-ENTITY LOAD BALANCING USING A DISTRIBUTED LEDGER

(71) Applicant: Change Healthcare Holdings, LLC, Nashville, TN (US)

(72) Inventor: Andras L. Ferenczi, Scottsdale, AZ (US)

(73) Assignee: Change Healthcare Holdings, LLC, Nashville, TN (US)

( * ) Notice: Subject to any disclaimer, the term of this patent is extended or adjusted under 35 U.S.C. 154(b) by 107 days.

(21) Appl. No.: 17/993,266

(22) Filed: Nov. 23, 2022

(65) Prior Publication Data

US 2024/0171396 A1 May 23, 2024

(51) Int. Cl.
*H04L 9/32* (2006.01)

(52) U.S. Cl.
CPC .................................... *H04L 9/32* (2013.01)

(58) Field of Classification Search
CPC ..... H04L 9/00; H04L 9/32; H04L 9/50; H04L 9/3213; H04L 9/3218; H04L 2209/88; H04L 67/1074; G06Q 30/01; G06Q 30/018; G06Q 40/08
USPC ........................................................ 713/168
See application file for complete search history.

(56) References Cited

U.S. PATENT DOCUMENTS

| | | | |
|---|---|---|---|
| 11,294,730 B2* | 4/2022 | Fu ........................ | G06F 9/5027 |
| 2005/0055435 A1* | 3/2005 | Gbadegesin ............ | H04L 67/14 |
| | | | 709/224 |
| 2016/0314253 A1* | 10/2016 | Incze ..................... | G06Q 40/08 |
| 2019/0065573 A1* | 2/2019 | Keller ................ | G06F 16/2453 |
| 2019/0287045 A1* | 9/2019 | Edwards ................ | G06Q 40/08 |
| 2020/0220805 A1* | 7/2020 | Dhanabalan .......... | H04L 41/046 |
| 2021/0183505 A1* | 6/2021 | Velaga ................ | G06F 16/9535 |
| 2022/0405852 A1* | 12/2022 | Fohr .................. | G06Q 20/3821 |
| 2023/0196471 A1* | 6/2023 | Mendell ................ | G06Q 40/08 |
| | | | 705/4 |
| 2023/0237499 A1* | 7/2023 | Padmanabhan ......... | G06F 16/27 |
| | | | 705/304 |
| 2023/0239348 A1* | 7/2023 | Padmanabhan ........... | H04L 9/50 |
| | | | 709/203 |
| 2023/0388122 A1* | 11/2023 | Saavedra .................. | H04L 9/50 |

* cited by examiner

*Primary Examiner* — James N Fiorillo
(74) *Attorney, Agent, or Firm* — MARSHALL, GERSTEIN & BORUN LLP (57) ABSTRACT

Systems and methods for performing cross-entity load balancing operations using a distributed ledger are provided herein. An example method may include, in response to receiving a valid invocation from a first entity, and based at least in part on data associated with the valid invocation, identifying a target entity from a plurality of candidate entities.

20 Claims, 6 Drawing Sheets

CROSS-ENTITY LOAD BALANCING USING A DISTRIBUTED LEDGER

BACKGROUND

Various entities (e.g., individuals, organizations) expose collaborative functionality via Application Processing Interfaces (APIs). Such operations may include claims processing, administrative checks, clinical validations, benefits calculations, member out-of-pocket determinations, and the like. Existing systems are often centralized such that one entity exerts control over other entities during collaborative operations.

There is a need for systems that are configured to facilitate trustless collaborative operations in accordance with preset rules that all entities have agreed to that can be enforced in a decentralized way where no single entity exerts control over the other participants.

Embodiments of the present disclosure provide systems and methods for facilitating cross-entity load balancing operations using a distributed ledger.

SUMMARY

In an embodiment, a method for facilitating cross-entity load balancing operations is provided herein. The method may comprise: in response to receiving a valid invocation from a first entity, and based at least in part on data associated with the valid invocation, identifying a target entity from a plurality of candidate entities; generating and providing a token and data associated with the target entity to the first entity; receive, from the target entity, a second invocation comprising the token and a zero-knowledge proof associated with the valid invocation; validating the zero-knowledge proof; and storing a data structure associated with the valid invocation on a distributed ledger.

The systems and methods described herein provide at least the following advantages. First, because the distributed cryptographic ledger is used to facilitate cross-entity load balancing operations, no single entity is able to exert control over other participants. Additionally, in some embodiments, a smart contract may execute financial transactions that are associated with requests between various entities without the need for conventional banking transactions which generally require additional actions and operations by at least one entity.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a system and method for decentralized claims processing. Together with the description, the figures further serve to explain the principles of the system and method for decentralized claims processing described herein and thereby enable a person skilled in the pertinent art to make and use the system and method for decentralized claims processing.

DETAILED DESCRIPTION

Embodiments of the present disclosure provide a decentralized system that facilitates secure interactions between multiple parties without the need for a central server, for example, using a distributed ledger such as a distributed cryptographic ledger. A smart contract may comprise a program running in a distributed environment or ledger. By way of example, a blockchain may comprise a plurality of nodes (e.g., millions of nodes) that each represent an organization, individual, or entity. In contrast with existing solutions which may distribute loads (e.g., workloads, workflows, requests, and the like) between various entities across multiple servers, embodiments of the present disclosure facilitate load balancing via a distributed ledger such that no single entity or server exercises control over the other participants. Said differently, a distributed ledger may operate as a reverse proxy to ensure that loads are requests are equitably distributed to various entities. In some embodiments, a smart contract can distribute service requests to various entities (e.g., organizations) based on a predetermined logic that has been agreed to by all participants.

Embodiments of the present disclosure may be configured to be implemented using a variety of network architectures and/or communication channels. For example, private communication channels such as a Virtual Private Network (VPN), a blockchain-as-a-service solution (e.g., International Business Machines (IBM) blockchain which may be a cloud-based solution, physical communication channels, combinations thereof, and the like.

Figure 1:
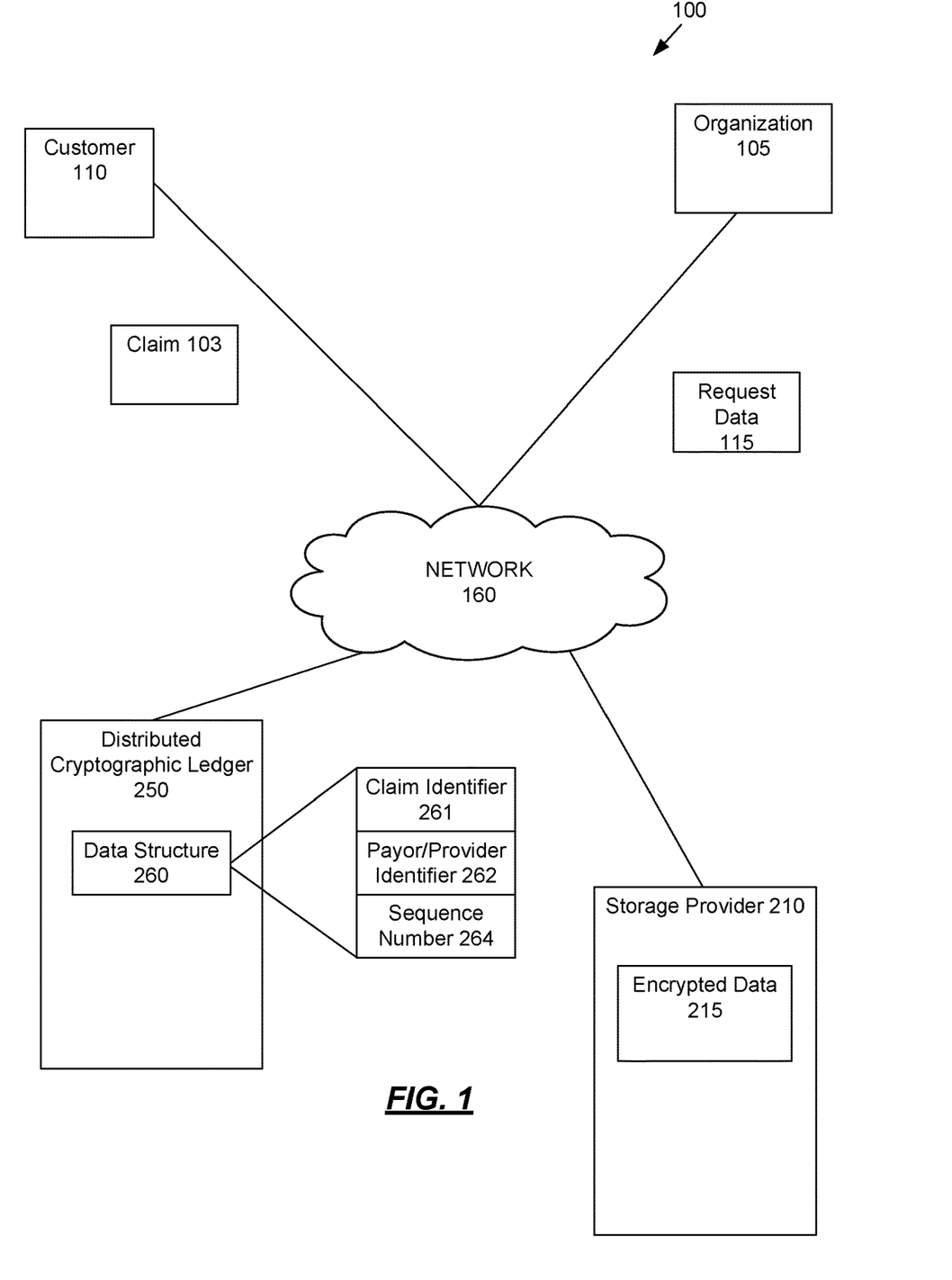
FIG. 1 is an example environment for performing load balancing operations using a distributed ledger in accordance with various embodiments of the present disclosure.

FIG. 1 is an example environment for performing cross-entity load balancing operations between various entities using a distributed ledger. As shown, the environment 100 may include one or more customers 110, one or more organizations 105, and one or more distributed cryptographic ledgers 250 in communication through a network 160. The network 160 may include a combination of private networks (e.g., LANs) and public networks (e.g., the Internet). Each of the one or more customers 110 and the one or more organizations 105 may be partially implemented by one or more general purpose computing devices such as the computing device 600 illustrated in FIG. 6.

The customer 110 may be a medical provider or any other entity that provides claim 103 to one or more claim payors. The claim 103 may be insurance claims, and in some embodiments, claim 103 related to medical services provided to a patient by the customer 110 or another entity. The organization 105 may include insurance companies, government entities, or any other entity that may process or evaluate claim 103 on behalf of patients or other entities.

To provide for efficient storage and to preserve the privacy of patients associated with the claim 103, the environment 100 may utilize both a storage provider 210 and/or a distributed cryptographic ledger 250. The storage provider 210 as used herein includes any entity that provides document storage services and includes dropbox storage providers ("DSP") and/or cloud-based document storage providers. Example storage providers include iCloud, Google Drive, Box, and OneDrive. Each storage provider 210 may expose an API through which the customers 110 and organizations 105 may write and read documents (e.g., claim 103) from the storage providers 210.

The distributed cryptographic ledger 250 may be or comprise a record keeping system where transactions (or any data structure 260) can be recorded in blocks on the ledger 250. Examples of suitable ledgers 250 include blockchain.

The data structure 260 may be a non-fungible token ("NFT"), although other types of data structures 260 may be used. The data structure 260 may include a plurality of fields including, but not limited to, a claim identifier 261, a payor/provider identifier 262, and address 263, and a sequence number 264. Other fields may be supported. In some embodiments, the claim identifier 261 may uniquely identify the claim 103 and may be associated with the same UUID. In some embodiments, the payor/provider identifier 262 may be the public key of a payor or provider that is associated with the claim 103. The sequence number 264 may be used to identify subsequent actions or responses with respect to the data structure 260. Each subsequent action taken with respect to the claim 103 may increment the sequence number 264 by one.

The customer 110 may provide a claim 103 for processing by one of a plurality of available organizations 105. The claim 103 may be associated with a medical service and may be formatted using the X12 transaction format. The claim 103 may be associated with a unique claim identifier such as a universal unique identifier (UUID). Any method for generating a UUID may be used. The storage provider 210 may store the claim 103 in encrypted data storage 215.

As described in detail herein, customers 110 and organizations 105 may interact with one another via a smart contract that is stored on the distributed cryptographic ledger 250. The smart contract may be a computer program or transaction protocol that is configured to automatically execute and/or faciliate one or more actions or events according to the terms of a contract, agreement, and/or agreed parameters. An example smart contract may be associated with one or more cryptocurrencies and may be run on a designated framework or platform, such as a public or private blockchain. Exemplary blockchains include, but are not limited to, Ethereum, Bitcoin, Binance Smart Chain, Solana, and Cardano.

Figure 2:
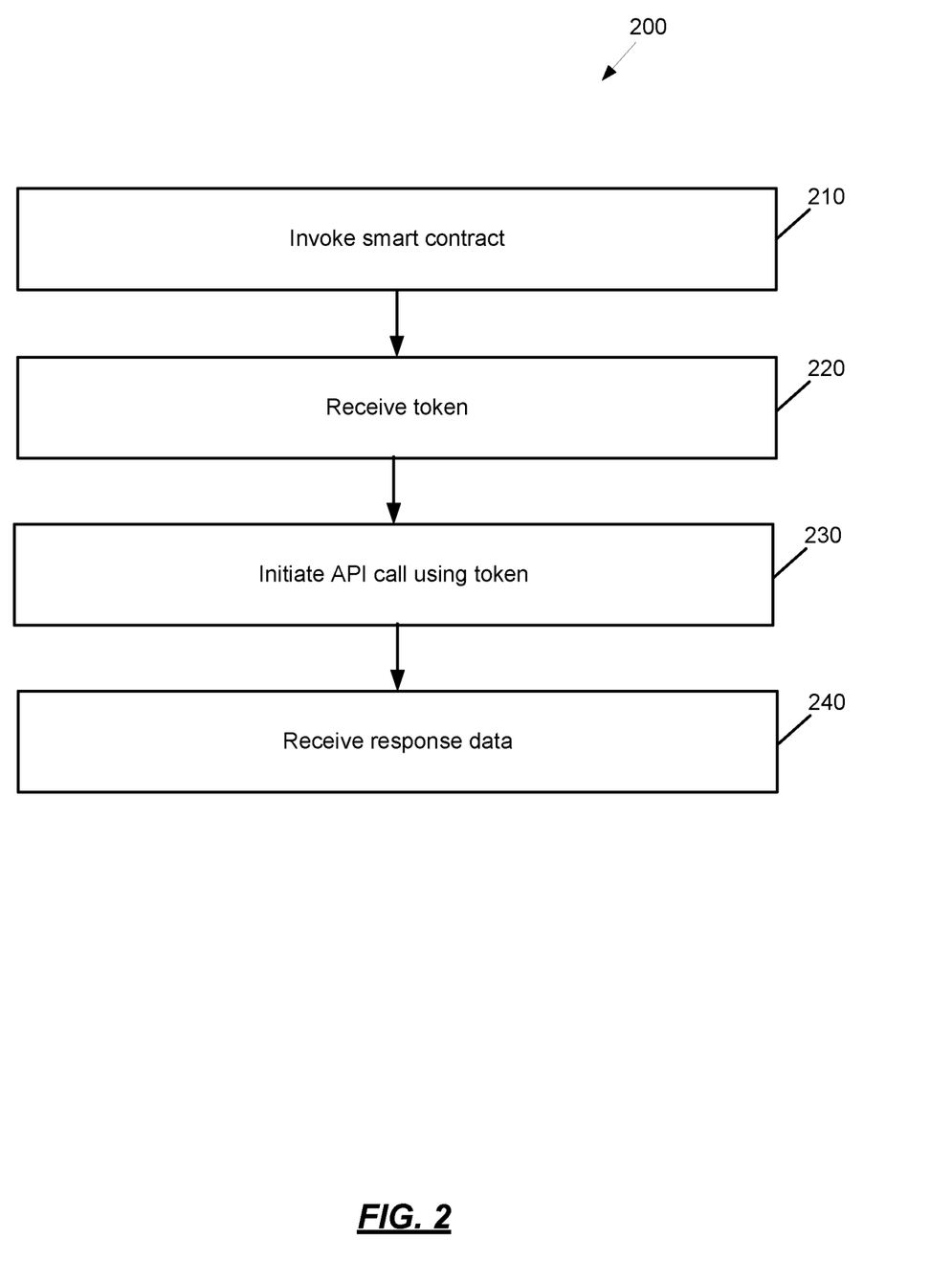
FIG. 2 is an illustration of a method performed by a customer in accordance with various embodiments of the present disclosure.
Figure 3:
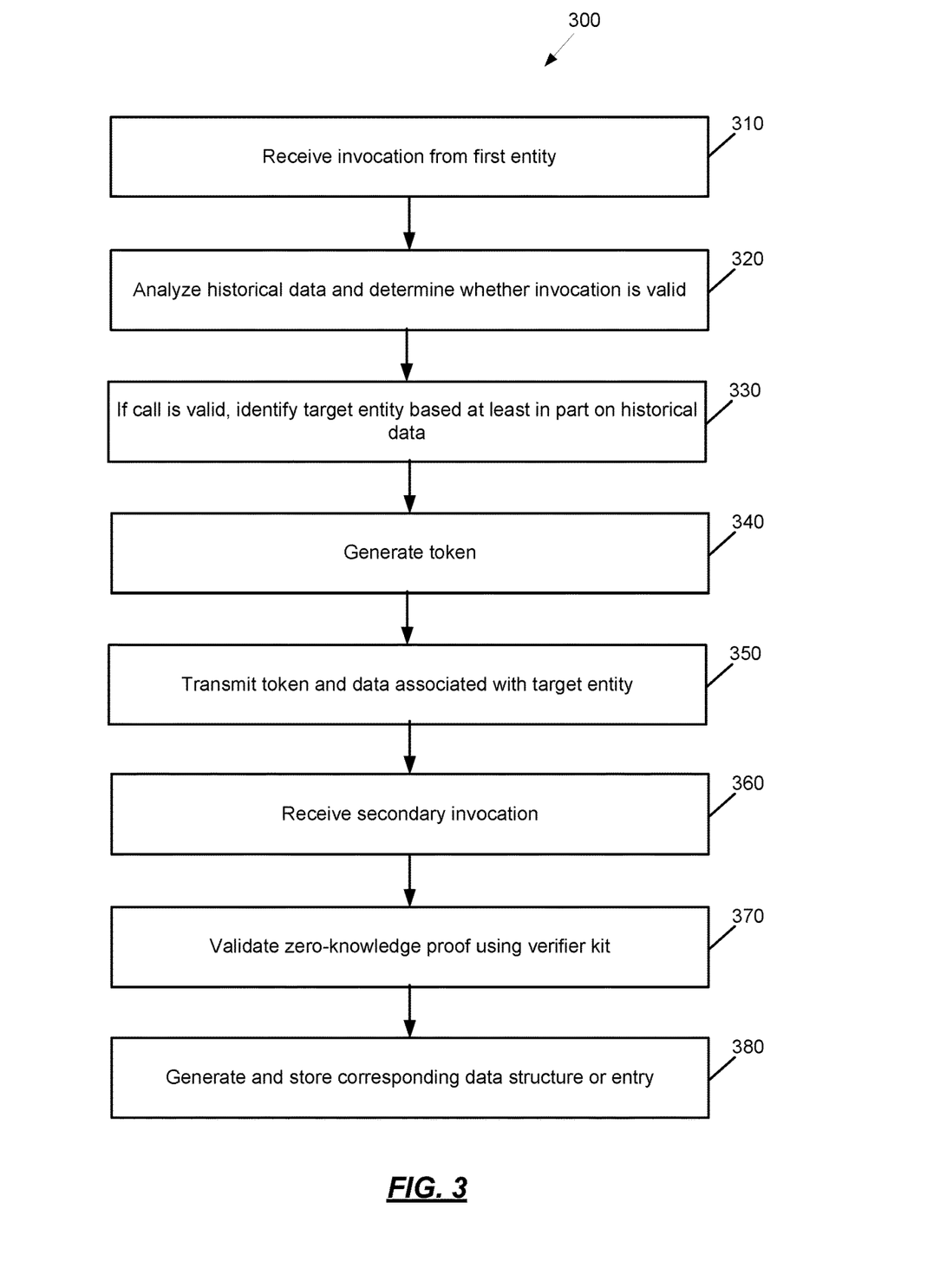
FIG. 3 is an illustration of a method performed by a smart contract in accordance with various embodiments of the present disclosure.
Figure 4:
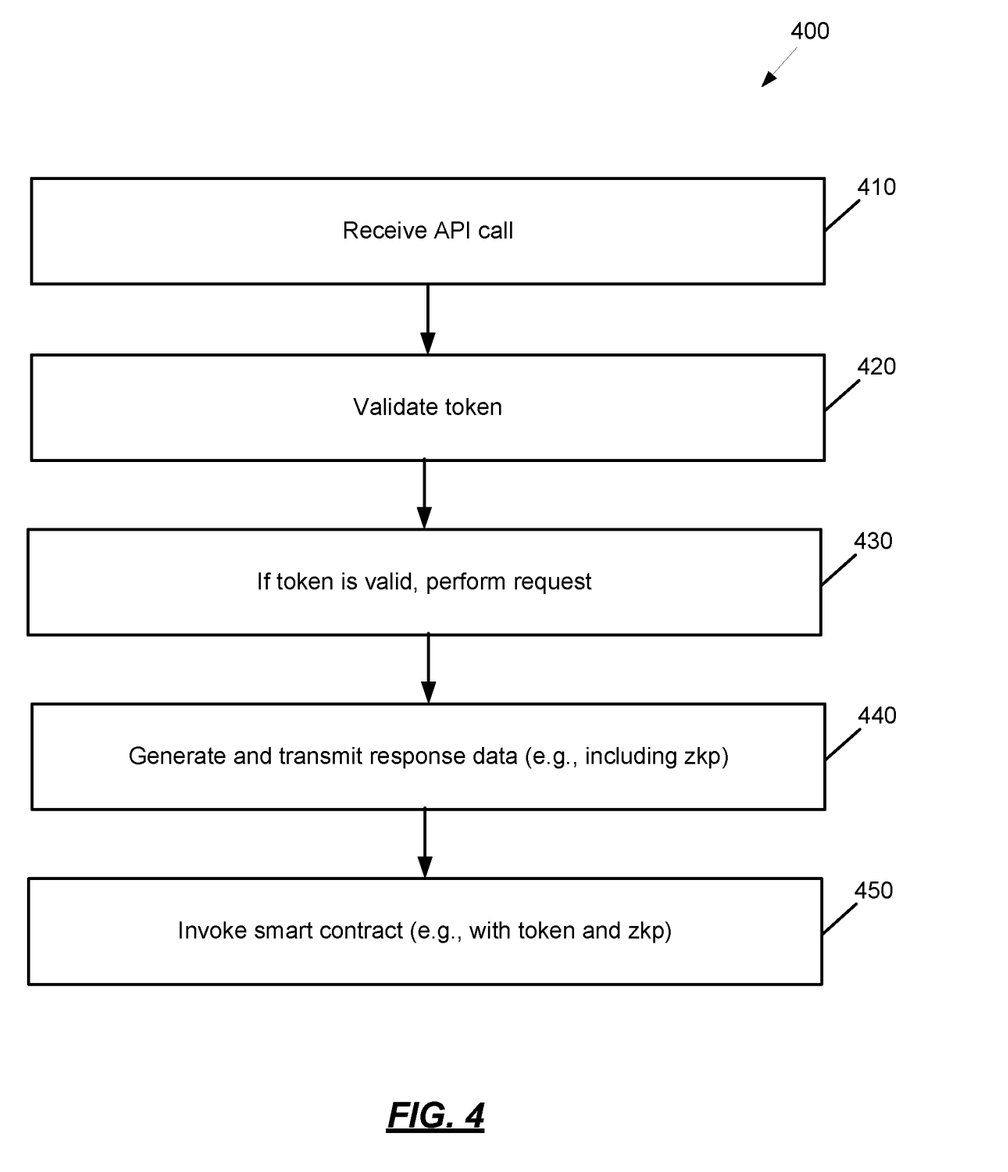
FIG. 4 is an illustration of a method performed by an organization in accordance with various embodiments of the present disclosure.

Referring now to FIG. 2, FIG. 3, and FIG. 4 exemplary operations for performing cross-entity load balancing operations by various entities (e.g., a customer and one or more organizations) that may all be participating in consensus are depicted. In some embodiments, the operations depicted in FIG. 2, FIG. 3, and FIG. 3 may be performed by various entities in different fields and contexts such as, but not limited to, healthcare, business services, customer service, insurance, banking, and the like. In some embodiments, each entity may be a node on a blockchain (e.g., private blockchain, public blockchain, or the like).

FIG. 2 is an illustration of a method 200 performed by a customer (e.g., first entity, actor, provider, individual, or the like). FIG. 3 is an illustration of a method 300 performed by a smart contract. FIG. 4. is an illustration of a method 400 performed by an organization (e.g., second entity, organization, service provider, or the like).

Referring now to FIG. 2, at 210, the customer (e.g., actor) invokes or transmits a request for a smart contract to perform a particular function (e.g., by requesting a token). In some embodiments, invoking a smart contract may comprise utilizing a script hash or Smart Contract Invocation Protocol (SCIP). In some embodiments, a customer invokes a smart contract with desired parameters. For example, the customer invokes a smart contract to request pricing, validation, or evaluation of a claim, or the like. In some embodiments, at 210, the customer may additionally pass non-Protected Health Information (PHI) or de-identified health information, such as payor and/or provider information. Additionally, at 210, the customer may further provide a digital token or digital currency (e.g., cryptocurrency).

Turning now to FIG. 3, at 310, the smart contract receives an initial invocation (e.g., call, request) from the customer. In some embodiments, the smart contract may further validate the identity of the sender of the request. For example, the smart contract may determine whether the sender of the initial invocation or request is one of a plurality of enrolled entities (e.g., medical providers) that are associated with the smart contract. Additionally, the request may pertain to a particular service. For example, the request may comprise a medical claim and a request to assess the propensity of the claim being accepted by a payor in order to avoid payment delays and/or claim rejections. In another example, a request may be for a credit check or approval with respect to an individual or company.

At 320, the smart contract analyzes stored data and/or historical data to determine whether the invocation (e.g., call) is valid. For example, the smart contract may analyze a log of prior invocations and determine whether the call is valid.

At 330, if the call is valid, the smart contract identifies a target entity based at least in part on the stored data and/or historical data. For example, the smart contract can identify one of a plurality of entities or organizations (e.g., a target entity) that should process the received call or request. In some embodiments, the smart contract can identify one of the plurality of entities or organizations that is next in line to process the request based on the historical data, logic of rotation, any penalties for organizations or service providers not responding to requests or pings from the smart contract (Distributed Ledger Technology (DLT) events requesting timely responses to requests, liveness checks, and the like). By way of example, the smart contract may evaluate a plurality of entities or organizations and select a target entity because it has not completed any incoming requests for a predetermined time period. For instance, from a group of three candidate organizations, if a first organization and a second organization have each completed requests within a predetermined time period and a third organization has not completed any requests within the predetermined time period, the smart contract may select/identify the third organization as the target entity. In another example, from the above example of three candidate organizations, the smart contract may choose a particular organization as the target entity if it satisfies one or more parameters that are associated with the call or request. By way of example, if a request includes a medical claim that is associated with the field of radiology, the smart contract may select an organization known to specialize in the field of radiology to execute the request.

At 340, the smart contract generates a token associated with the invocation or request. In some examples, the token may comprise a UUID.

At 350, the smart contract provides the token and data associated with the target entity to the customer. For example, the smart contract can return the next service in line to perform the request. Additionally, the smart contract may send a Uniform Resource Locator (URL) of the target entity or organization in conjunction with the token.

Returning to FIG. 2, at 220, the customer receives the token from the smart contract, in addition to any other information (e.g., the target entity's URL).

At 230, the customer initiates API call to the target entity (e.g., organization) using the received token and/or additional information, such as the target entity's URL). In some embodiments, the API call may utilize a JSON Web Token (JWT) standard or protocol to securely transmit information between two entities or parties.

Referring now to FIG. 4, at 410 the organization (e.g., target entity identified by the smart contract) receives the API call from the customer. The API call may include request data, such as a claim that needs to be validated or otherwise processed by the organization. In some examples, the claim may be in Extensible Markup Language (XML) format, Electronic Data Interchange (EDI) 837 format, or the like.

At 420, the organization validates the token received from the customer. For example, the organization may verify that the received token originated from a particular DLT platform or blockchain. In some examples, the customer may provide a JWT token that is signed with a private key that is in turn associated with a public DLT platform/smart contract. In some embodiments, the organization additionally performs authentication and/or authorization operations (e.g., authN and/or authZ). In some examples, the organization may provide an API key and/or request a message authentication code (MAC) from the customer that is signed with a private key that is associated with the address. Accordingly, the organization may not need to onboard a particular customer directly and may rely on the smart contract to onboard the entities that are engaging with the organization.

At 430, if the token is valid, the organization performs the request. For example, the organization may evaluate or process a received claim.

At 440, the organization generates response data. In some examples, the organization can create a zero-knowledge proof (zkp) with respect to a received claim. The zero-knowledge proof for the claim (or other types of requests) may allow the organization to prove to another party or entity that the request was complete without having to provide any information about the contents of the claim or request (e.g., personally identifiable information (PII) or protected health information (PHI). In some embodiments, the organization may generate the zero-knowledge proof using Pedersen Commitments where the organization selects a random value T and generates the zero-knowledge proof using a hash of the claim and the random value T. The organization may store data corresponding with the request locally along with the value T. In some embodiments, the organization may use a prover's kit that is distributed to all entities by a trusted party, or created via a Multi-party computation (MPC) ceremony or protocol (e.g., similar to Zcash).

At 450, the organization invokes the smart contract (e.g., performs a second invocation) and transmits the response data (e.g., including the token and zkp) to the smart contract.

Returning to FIG. 3, at 360, the smart contract receives the secondary invocation/response data (e.g., token and zkp).

At 370, in some embodiments, the smart contract validates the zkp. For example, the smart contract may validate the zkp using a verifier kit.

At 380, if the data is successfully validated/verified, the smart contract generates and stores a corresponding data structure or entry (e.g., updates accounting). The entry may be stored in tabular form and may include information associated with the customer, organization, token, zkp, and the like. In particular, the smart contract can update a ledger that is used to track/monitor all requests and responses for accounting/payout purposes.

In some embodiments, the smart contract returns at least a portion of the response data (e.g., including data associated with a request in the initial invocation) to the customer.

Referring back to FIG. 2, at 240, the customer receives at least a portion of the response data (e.g., from the smart contract). In some embodiments, the customer may receive the portion of the response data directly from the organization executing the request.

Returning to FIG. 1, as illustrated, the smart contract may generate and store a data structure 260. As noted above, in the example of a claim 103, the data structure 260 may comprise a claim identifier 261, a payor/provider identifier 262, and a sequence number 264.

Accordingly, the smart contract can store historical data relating to received and completed requests. The smart contract may allocate renumeration (e.g., cryptocurrency, stable coin, a treasury token, a non-fungible token, or the like) to the organization that has completed the request, where the form of renumeration is associated with the DLT platform. For example, each organization may be associated with a wallet that the smart contract can use to deposit a payment. The smart contract may further update the data structure 260 and/or the storage provider 210 to indicate that a payment has been made. For example, the smart contract may store an encrypted receipt of the payment on the ledger using a shared secret key and may update the data structure 260 to reflect the payment.

In various examples, the smart contract may settle payments between the customer and other entities/organizations. In some embodiments, the smart contract may retain a fee from funds received from a customer for payment to an organization. In some examples, a customer may provide feedback regarding services rendered which is also recorded and stored by the smart contract. The smart contract may use such information to generate ratings or scores for organizations that can also be used to identify or select target entities for fulfilling future requests. By way of example, an organization with a high score may be entitled to a higher proportion of incoming requests.

Figure 5:
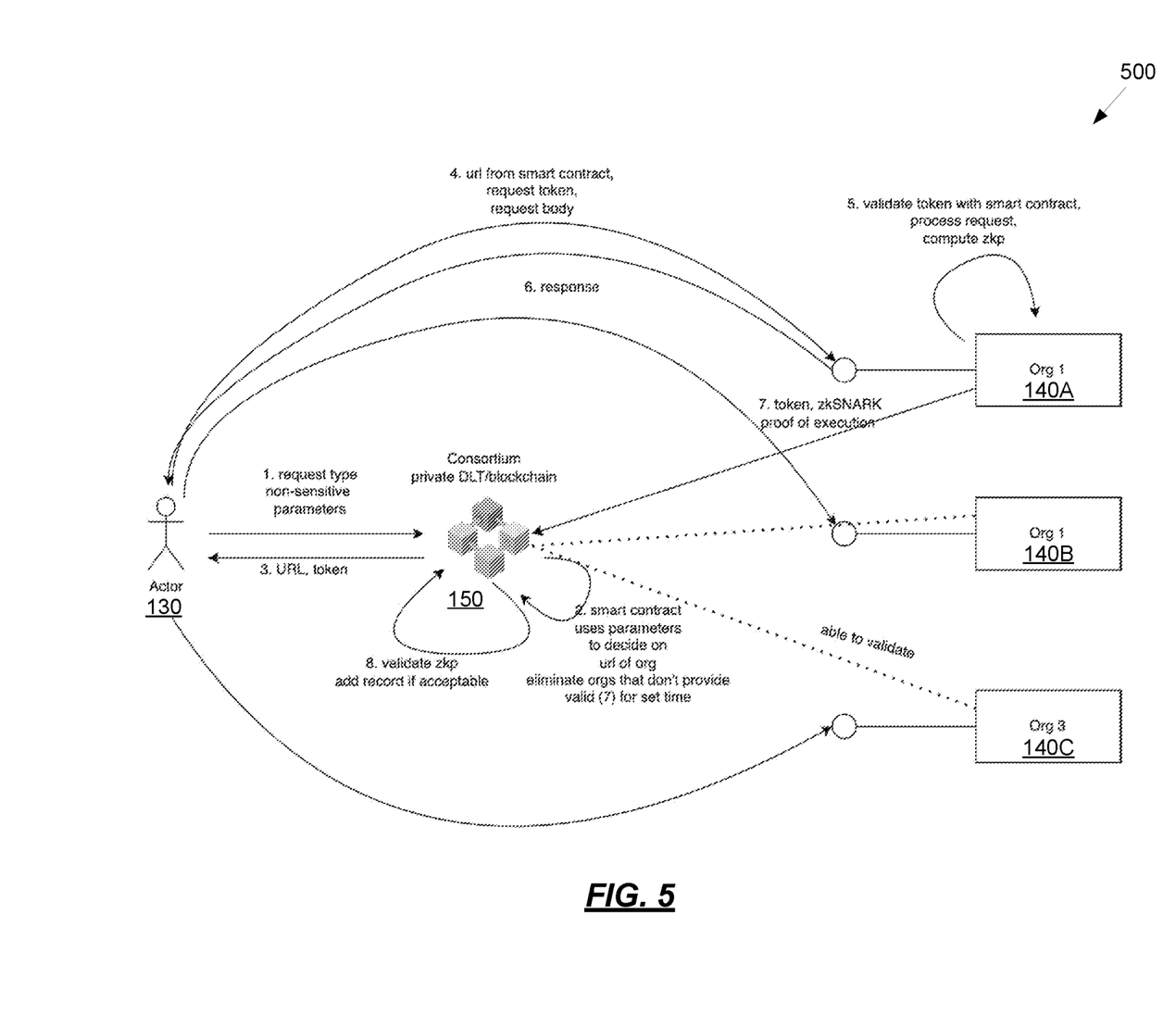
FIG. 5 is another example environment for performing load balancing operations using a distributed ledger in accordance with various embodiments of the present disclosure.

Referring now to FIG. 5, another example environment 500 for performing load balancing operations using a distributed ledger in accordance with various embodiments of the present disclosure is proved. As depicted, a distributed cryptographic ledger 150 (e.g., smart contract) may facilitate cross-entity load balancing operations between various organizations 140A, 140B, and 140C on behalf of a customer 130 (e.g., actor). Exemplary operations are discussed in more detail above with reference to FIG. 2, FIG. 3, and FIG. 4.

As depicted in FIG. 5, at step/operation 1, a customer 130 (e.g., actor) invokes or transmits a request with target parameters to a distributed cryptographic ledger 150 (e.g., smart contract). For example, the customer 150 invokes a smart contract to request pricing of a claim, validation or evaluation of a claim, or the like. In some embodiments, the customer 130 may also provide additional information (e.g., relating to a particular claim such as payer information, provider information, and the like).

At step/operation 2, the distributed cryptographic ledger 150 (e.g., smart contract) uses the received parameters to identify a target organization for the request and an associated URL. For example, the smart contract may review a log of prior invocations and determine whether the received request/call is valid. The smart contract may identify a target organization from a plurality of candidate organizations that is next in line to process the request based on history, logic of rotation, any penalties for organizations not responding to requests, and so on (e.g., DLT events requesting timely responses, liveness checks, and the like).

At step/operation 3, the distributed cryptographic ledger 150 (e.g., smart contract) returns the next service in line to perform the request, including a token (e.g., UUID), and a target organization URL.

At step/operation 4, the customer 130 calls the API for the target organization (as depicted, first organization 140A).

At step/operation 5, the target organization (e.g., first organization 140A) validates the token from the customer 130 (along with regular authn/authz), performs the request, returns the response and creates a zkp that proves that the request was performed without disclosing any PII/PHI data about the nature of the request using a prover's kit distributed to all entities by a trusted party, or created via an MPC ceremony (similar to zcash).

At step/operation 6, the target organization (e.g., first organization 140A) returns a response to client/customer 130.

At step/operation 7, the target organization (e.g., first organization 140A) invokes the distributed cryptographic ledger 150 (e.g., smart contract) with a token and zkp.

At step/operation 8, the distributed cryptographic ledger 150 (e.g., smart contract) validates the zkp using a verifier kit. If the information is validated, the smart contract creates an entry and updates accounting. For example a smart contract ledger may track all requests/responses for accounting/payout purposes. In some embodiments, tokenization of a crypto bridge connecting a private DLT with a public network (e.g., layer2 solution) may be implemented to perform payment payouts by customers to organizations providing these services. In some embodiments, an enterprise-grade DLT such as a Hyperledger Besu (e.g., Ethereum client), may be used as a bridge to public blockchains. In such examples, business interactions performed on the private network can directly trigger automated cryptographic payments on a public blockchain (e.g., Ethereum).

Figure 6:
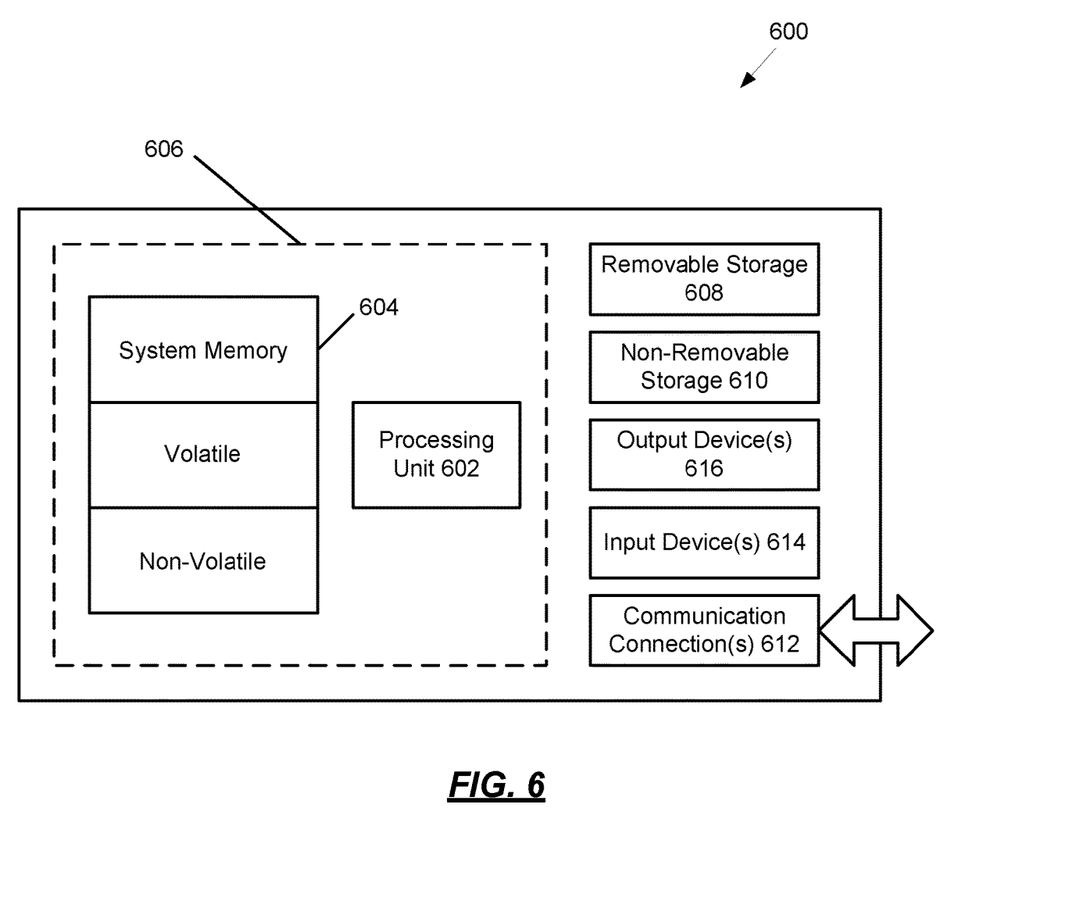
FIG. 6 shows an example computing environment in which example embodiments and aspects may be implemented.

FIG. 6 shows an example computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an example system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating cross-entity load balancing operations, the method comprising:
    in response to receiving a valid invocation from a first entity of a plurality of entities,
    identifying, by one or more processors and by a smart contract stored on a distributed ledger, a target entity from a plurality of candidate entities of the plurality of entities, wherein the smart contract executes transactions that are associated with invocations between the plurality of entities so that no one entity of the plurality of entities executes control over any other of the plurality of entities; and
    generating and providing, by the one or more processors, a token and data associated with the target entity to the first entity;
    receiving, by the one or more processors and from the target entity, a second invocation comprising the token and a zero-knowledge proof associated with the valid invocation;
    validating, by the one or more processors, the token and the zero-knowledge proof, wherein the zero-knowledge proof indicates the valid invocation was performed without disclosing protected health information (PHI) or personally identifiable information (PII) data associated with the valid invocation; and
    storing, by the one or more processors, a data structure associated with the valid invocation on the distributed ledger.

2. The method of claim 1, wherein the zero-knowledge proof is validated using a verifier kit.

3. The method of claim 1, wherein the valid invocation comprises a medical claim.

4. The method of claim 1, wherein identifying the target entity is based on data associated with the valid invocation comprising one or more of: (i) historical data, (ii) agreed terms between the first entity and each of the plurality of candidate entities, or (iii) at least one parameter associated with the plurality of candidate entities.

5. The method of claim 1, wherein the data structure is a non-fungible token.

6. The method of claim 1, further comprising:
    subsequent to validating the zero-knowledge proof, allocating, by the one or more processors, renumeration associated with the valid invocation to the target entity.

7. The method of claim 1, wherein the first entity comprises a customer, and wherein the plurality of candidate entities comprises service providers.

8. A system comprising:
    one or more processors; and
    one or more memories storing processor-executable instructions that, when executed by the one or more processors, cause the one or more processors to perform operations comprising:
    in response to receiving a valid invocation from a first entity of a plurality of entities,
    identifying, by a smart contract stored on a distributed ledger, a target entity from a plurality of candidate entities of the plurality of entities, wherein the smart contract executes transactions that are associated with invocations between the plurality of entities so that no one entity of the plurality of entities executes control over any other of the plurality of entities; and
    generating and providing a token and data associated with the target entity to the first entity;
    receiving, from the target entity, a second invocation comprising the token and a zero-knowledge proof associated with the valid invocation;
    validating, the token and the zero-knowledge proof, wherein the zero-knowledge proof indicates the valid invocation was performed without disclosing protected health information (PHI) or personally identifiable information (PII) data associated with the valid invocation; and
    storing a data structure associated with the valid invocation on the distributed ledger.

9. The system of claim 8, wherein the zero-knowledge proof is validated using a verifier kit.

10. The system of claim 8, wherein the valid invocation comprises a medical claim.

11. The system of claim 8, wherein identifying the target entity is based on data associated with the valid invocation comprising one or more of: (i) historical data, (ii) agreed terms between the first entity and each of the plurality of candidate entities, or (iii) at least one parameter associated with the plurality of candidate entities.

12. The system of claim 8, wherein the data structure is a non-fungible token.

13. The system of claim 8, wherein the processor-executable instructions further cause the one or more processors to perform operations comprising:
    subsequent to validating the zero-knowledge proof, allocating renumeration associated with the valid invocation to the target entity.

14. The system of claim 8, wherein the first entity comprises a customer, and wherein the plurality of candidate entities comprises service providers.

15. One or more non-transitory computer-readable media storing processor-executable instructions that, when executed by one or more processors, cause the one or more processors to perform operations comprising:
    in response to receiving a valid invocation from a first entity of a plurality of entities, identifying, by a smart contract stored on a distributed ledger, a target entity from a plurality of candidate entities of the plurality of entities, wherein the smart contract executes transactions that are associated with invocations between the plurality of entities so that no one entity of the plurality of entities executes control over any other of the plurality of entities; and generating and providing a token and data associated with the target entity to the first entity;

receiving, from the target entity, a second invocation comprising the token and a zero-knowledge proof associated with the valid invocation;

validating, the token and the zero-knowledge proof, wherein the zero-knowledge proof indicates the valid invocation was performed without disclosing protected health information (PHI) or personally identifiable information (PII) data associated with the valid invocation; and storing a data structure associated with the valid invocation on the distributed ledger.

16. The one or more non-transitory computer-readable media of claim 15, wherein the zero-knowledge proof is validated using a verifier kit.

17. The one or more non-transitory computer-readable media of claim 15, wherein the valid invocation comprises a medical claim.

18. The one or more non-transitory computer-readable media of claim 15, wherein identifying the target entity is based on data associated with the valid invocation comprising one or more of: (i) historical data, (ii) agreed terms between the first entity and each of the plurality of candidate entities, or (iii) at least one parameter associated with the plurality of candidate entities.

19. The one or more non-transitory computer-readable media of claim 15, wherein the data structure is a non-fungible token.

20. The one or more non-transitory processor-readable media of claim 15, wherein the processor-executable instructions further cause the one or more processors to perform operations comprising:

subsequent to validating the zero-knowledge proof, allocating renumeration associated with the valid invocation to the target entity.

* * * * *